US012665108B2

(12) United States Patent
Hirth et al.

(10) Patent No.: US 12,665,108 B2
(45) **Date of Patent: *Jun. 23, 2026**

(54) ELECTRICAL FEEDTHROUGH WITH POROUS CERAMIC LAYER AND A PORE FILLER

(71) Applicant: Vitesco Technologies GmbH, Regensburg (DE)

(72) Inventors: Peter Hirth, Rösrath (DE); Stefan Ahlers, Bergisch (DE)

(73) Assignee: Vitesco Technologies GmbH, Regensburg (DE)

( * ) Notice: Subject to any disclaimer, the term of this patent is extended or adjusted under 35 U.S.C. 154(b) by 113 days.

This patent is subject to a terminal disclaimer.

(21) Appl. No.: 18/684,005

(22) PCT Filed: Aug. 4, 2022

(86) PCT No.: PCT/EP2022/071928

§ 371 (c)(1),
(2) Date: Feb. 15, 2024

(87) PCT Pub. No.: WO2023/025560

PCT Pub. Date: Mar. 2, 2023

(65) Prior Publication Data

US 2024/0371547 A1 Nov. 7, 2024

(30) Foreign Application Priority Data

Aug. 24, 2021 (DE) ..................... 10 2021 209 264.0

(51) Int. Cl.

*H01B 17/26* (2006.01)
*F01N 3/027* (2006.01)

(Continued)

(52) U.S. Cl.

CPC ............... *H01B 17/26* (2013.01); *H01B 3/12* (2013.01)

(58) Field of Classification Search

None

See application file for complete search history.

(56) References Cited

U.S. PATENT DOCUMENTS 4,362,016 A 12/1982 Papadopulous
5,904,903 A * 5/1999 Hotz ..................... F01N 3/2013 422/174

(Continued)

FOREIGN PATENT DOCUMENTS

CN 1768394 5/2006
CN 104205504 12/2014

(Continued)

OTHER PUBLICATIONS

Office Action of corresponding German Patent Application No. DE 10 2021 209 264.0.

(Continued)

*Primary Examiner* — Timothy J Thompson
*Assistant Examiner* — Amol H Patel
(74) *Attorney, Agent, or Firm* — COZEN O'CONNOR

(57) ABSTRACT

A feedthrough for an electrical conductor for electrical connection of an electrically heatable heating disk, especially in an exhaust gas system of an internal combustion engine, through a housing, where the feedthrough has an internal conductor, an outer sleeve, and at least one insulator, where the insulator is disposed between the internal conductor and the outer sleeve such that the internal conductor is electrically insulated from the outer sleeve. The insulator is formed by a porous ceramic layer, where pores in the ceramic layer are at least partly filled by a pore filler.

13 Claims, 1 Drawing Sheet

(51) Int. Cl.

| | |
|---|---|
| ***F01N 3/20*** | (2006.01) |
| ***F01N 9/00*** | (2006.01) |
| ***H01B 3/12*** | (2006.01) |
| ***H05B 3/06*** | (2006.01) |
| ***H05B 3/84*** | (2006.01) |

(56) References Cited

U.S. PATENT DOCUMENTS

| | | | | |
|---|---|---|---|---|
| 9,300,124 | B2 * | 3/2016 | Restis .................. | H02G 15/043 |
| 2005/0008835 | A1 | 1/2005 | Hiramatsu et al. | |
| 2015/0011115 | A1 | 1/2015 | Hirth et al. | |

FOREIGN PATENT DOCUMENTS

| | | |
|---|---|---|
| CN | 111094711 | 5/2020 |
| CN | 115885095 | 3/2023 |
| DE | 4435784 | 4/1996 |
| DE | 69732319 | 12/2005 |
| DE | 102020210889 | 3/2022 |
| WO | WO 2022043006 | 3/2022 |

OTHER PUBLICATIONS

PCT, Third Party Observation, Aug. 17, 2023.
Office Action of corresponding Chinese Patent Application No. 202280054798.0, dated Mar. 30, 2026.

* cited by examiner

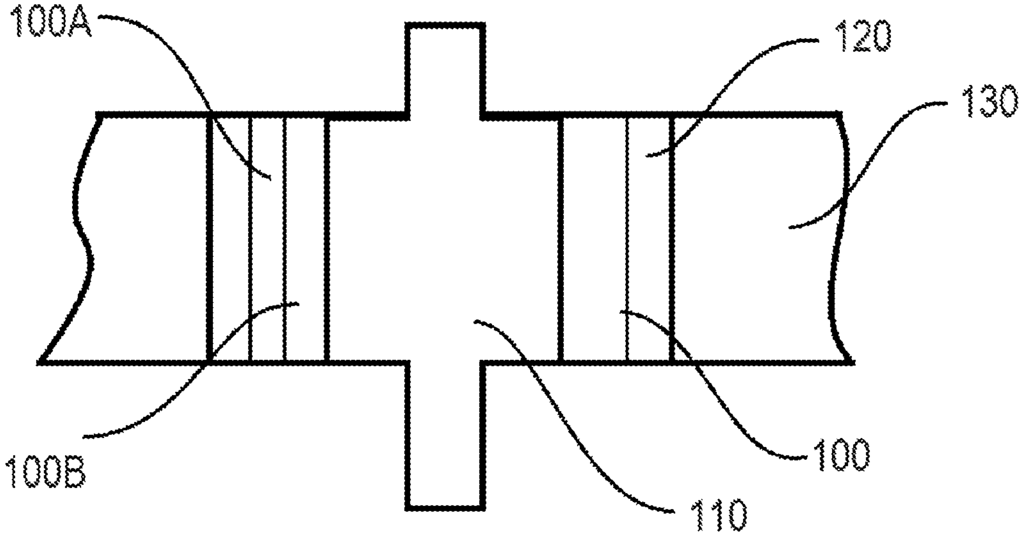
100A
120
130
100B
100
110

ELECTRICAL FEEDTHROUGH WITH POROUS CERAMIC LAYER AND A PORE FILLER

CROSS REFERENCE TO RELATED APPLICATIONS

This is a U.S. national stage of Application No. PCT/EP2022/071928 filed Aug. 4, 2022. Priority is claimed on German Application No. DE 10 2021 209 264.0 filed Aug. 24, 2021, the content of which is incorporated herein by reference.

BACKGROUND OF THE INVENTION

1. Field of the Invention

The disclosure relates to a feedthrough for an electrical conductor for electrical connection of an electrically heatable heating disk, especially in an exhaust gas system of an internal combustion engine, through a housing, where the feedthrough has an internal conductor, an outer sleeve, and at least one insulator, where the insulator is disposed between the internal conductor and the outer sleeve such that the internal conductor is electrically insulated from the outer sleeve. The disclosure also relates to a process for producing a feedthrough.

2. Description of the Related Art

Heating of exhaust gases in an exhaust gas tract downstream of an internal combustion engine is nowadays regularly accomplished using electrical heating elements. The aim here is to more quickly attain a temperature threshold from which effective transformation of the pollutants entrained in the exhaust gas is possible. This is necessary since the catalytically active surfaces of the catalysts that are used for exhaust gas aftertreatment only enable sufficient conversion of the respective pollutants from a minimum temperature, called the lightoff temperature.

The known solutions in the prior art include what are called heated catalytic converters having a metallic structure connected to a voltage source, which can be heated up by exploitation of ohmic resistance.

For the purpose of electrical contact connection of the heatable structure, it is necessary to route an electrical conductor through the housing of the exhaust gas tract at at least one point. It is necessary here to ensure that the feedthrough is gas-tight, and also that there is electrical insulation between the housing and the electrical conductor, and that sufficient long-term durability is assured.

The prior art discloses electrical feedthroughs having a conical internal conductor partially coated with a porous ceramic layer, for example. The porous coating here is followed by a metallic sleeve with a conical internal cross section. The internal conductor serves here for contact connection of the structure to be heated, while the porous layer constitutes an electrical insulation. The metallic sleeve serves ultimately for fixing of the feedthrough in the housing, although the sleeve is electrically insulated from the internal conductor.

A particular disadvantage of the prior art devices is that the electrical insulation effect is insufficient as soon as the internal conductor is subjected to a higher voltage, and the feedthrough is exposed to a moist, salt-containing atmosphere through the housing. The porous ceramic used has a tendency to become saturated with salty solution from the environment of the feedthrough. This gives rise to an electrolytic bridge through the ceramic layer, and electrical insulation is no longer assured.

Organic sealants are known, which are used for reduction of the porosity of the ceramic layer. However, these are not durable enough under the stresses that occur. Alternative sealants of the inorganic type regularly lead to cracking under thermal stresses because of different coefficients of thermal expansion.

SUMMARY OF THE INVENTION

It is therefore an object of one aspect of the present invention to provide a feedthrough for at least one electrical conductor through the housing of an exhaust gas tract, having a durable ceramic layer for insulation of the internal conductor with respect to an external sleeve or the housing.

A preferred working example of the invention can be used in the exhaust gas aftertreatment from an internal combustion engine in an automotive application. The invention can likewise be used in stationary installations, for example power generators.

One aspect of the invention relates to a feedthrough for an electrical conductor for electrical connection of an electrically heatable heating disk, especially in an exhaust gas system of an internal combustion engine, through a housing, where the feedthrough has an internal conductor, an outer sleeve, and at least one insulator, where the insulator is disposed between the internal conductor and the outer sleeve such that the internal conductor is electrically insulated from the outer sleeve, wherein the insulator is formed by a porous ceramic layer, where pores in the ceramic layer are at least partly filled by a pore filler.

The ceramic layer used as an insulator has a certain porosity because of the material used. Depending on the ceramic used, this may be larger or smaller, such that the pore sizes are or the average pore size is larger or smaller. The pores of the ceramic, if they are unfilled or filled with air, have the effect that the ceramic layer becomes less stable to thermal cycling stresses. Furthermore, the pores have the effect that the ceramic layer can become saturated with a liquid medium, for example a salty solution. This can form conduction bridges that destroy the electrical insulation effect of the ceramic layer. Furthermore, there can be structural damage to the ceramic layer, for example as a result of scouring.

Preferably, therefore, the insulator is contacted with a pore filler, wherein the pore filler is deposited into the pores of the ceramic layer and the pores are thus filled completely or at least partly. The filled pores can thus no longer become saturated with the salty solution, which prevents the formation of conduction bridges. Furthermore, the ceramic layer is significantly more resistant to thermal cycling stresses as a result of the pore filler, which improves long-term durability.

It is particularly advantageous when the pore filler has a coefficient of thermal expansion corresponding to the common coefficient of thermal expansion of the internal conductor and the unfilled porous ceramic layer.

This is advantageous in order to achieve a structure of maximum homogeneity in respect of the respective coefficients of thermal expansion. Greatly different coefficients of thermal expansion in adjacent structures, especially in the event of thermal cycling stress, can lead to distinctly faster damage to the structures since the individual structures expand to different degrees under the action of heat. The different expansions give rise to stresses at the interface layers that can lead to cracks or breaks in the material.

The term "common coefficient of thermal expansion" means a coefficient of thermal expansion very similar to the two individual coefficients of thermal expansion of the internal conductor material and of the ceramic layer material. This is intended to avoid excessively large differences in the coefficients of thermal expansion of the three elements. In particular, the difference between the coefficient of thermal expansion of the pore filler and of the ceramic layer should be very similar in order not to create any great stresses in the region of the interface layers between the pore filler in the pores of the ceramic layer and the ceramic layer that could lead to breakup of the ceramic layer from the inside outward.

It is also advantageous when the pore filler is formed by nanoparticles introduced into the pores of the porous ceramic layer. Nanoparticles are notable in particular for their small size. This is advantageous especially since the average pore size of the ceramic layers that are regularly used is particularly small, such that it is necessary to use a very fine material in order to partly or completely fill the pores. Nanoparticles preferably have an average size of 1 to 100 nanometers.

A preferred working example is characterized in that the size of the nanoparticles is dependent on the average pore size distribution of the ceramic layer, where the nanoparticles are 10% to 80% smaller than the average pore size of the ceramic layer.

The difference in size between the average pore size and the average size of the nanoparticles can ensure that the nanoparticles can penetrate in a simple and uncomplicated manner into the pores of the ceramic layer and accumulate therein. In the case of a smaller difference in size, there could also be jamming of the nanoparticles at the walls of the pores, such that these are inadequately filled. Distinctly smaller nanoparticles are therefore advantageous in order to be able to fill the pores in the best possible manner.

In addition, it is advantageous when the porous ceramic layer is formed from at least two layers. Two layers may especially have different material properties, which means that, for example, an interface layer at the internal conductor has different material properties than the interface layer at the outer sleeve. This can avoid the occurrence of stresses or damage. In particular, the two layers can have different coefficients of thermal expansion or different pore sizes.

A difference in pore sizes can be utilized, for example, such that the pores are filled with the pore filler to different levels of filling. The level of filling of the pore filler in the pores can also influence the properties of the individual layers. The coefficient of thermal expansion of a layer that results overall from the base material and the pore filler can thus differ from or be approximated to the other layer.

In addition, it is appropriate when the layers have equal coefficients of thermal expansion. Equal or similar coefficients of thermal expansion are advantageous in order to create a material of maximum homogeneity and especially to avoid the occurrence of stress-induced cracks or breaks.

It is also preferable when the ceramic layer is formed by a plasma-sprayed ceramic which is thermally stable up to 1200 degrees Celsius.

One working example of the invention relates to a process for producing a feedthrough, wherein the porous ceramic layer is contacted with the pore filler in two or more successive passes, increasing the filling level of the pores with each pass.

The filling or saturating of the ceramic layer with the pore filler can preferably take place in two or more successive passes, with intercalation of the pore filler in the pores of the ceramic layer in each pass. The repeating of the contacting can especially increase the filling level of the pores, since, after a first intercalation of a nanoparticle, further nanoparticles can be deposited in the next pass. It is thus possible overall to create a more homogeneous layer and to specifically enhance the material property created by the pore filler in a controlled manner up to a desired degree.

It is also advantageous when the average size of the nanoparticles used is reduced from pass to pass. The reducing of the average size of the nanoparticles used from pass to pass can likewise improve the filling level of the individual pores. The pores occupied by a first nanoparticle have a smaller internal volume than the unoccupied pores. Much smaller nanoparticles allow even these reduced volumes to be filled in further passes.

It is also appropriate when the feedthrough with the porous ceramic layer filled with pore filler is subjected to a sintering process. The sintering process serves to consolidate the ceramic layer created by the filling with nanoparticles.

BRIEF DESCRIPTION OF THE DRAWINGS

The FIGURE is a schematic representation of a feedthrough.

DETAILED DESCRIPTION OF THE PRESENTLY PREFERRED EMBODIMENTS

The FIGURE shows a feedthrough for an electrical conductor for electrical connection of an electrically heatable heating disk, especially in an exhaust gas system of an internal combustion engine, through a housing 130, where the feedthrough has an internal conductor 110, an outer sleeve 120, and at least one insulator 100, where the insulator 100 is disposed between the internal conductor 110 and the outer sleeve 120 such that the internal conductor 110 is electrically insulated from the outer sleeve 120, wherein the insulator 100 is formed by a porous ceramic layer, where pores in the ceramic layer are at least partly filled by a pore filler.

As shown on the left side of the FIGURE, optionally the porous ceramic layer is formed from at least two layers 100A, 100B. Two layers may especially have different material properties, which means that, for example, an interface layer 100B at the internal conductor 110 has different material properties than the interface layer 100A at the outer sleeve 120. This can avoid the occurrence of stresses or damage. In particular, the two layers 100A, 100B can have different coefficients of thermal expansion or different pore sizes.

Advantageous developments of the present invention are described in the dependent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A feedthrough for an electrical conductor for electrical connection of an electrically heatable heating disk through a housing, comprising:

an internal conductor;

an outer sleeve;

at least one insulator formed by a porous ceramic layer and disposed between the internal conductor and the outer sleeve such that the internal conductor is electrically insulated from the outer sleeve; and a pore filler configured to at least partly fill pores in the porous ceramic layer.

2. The feedthrough as claimed in claim 1, wherein the pore filler has a coefficient of thermal expansion corresponding to a common coefficient of thermal expansion of the internal conductor and the porous ceramic layer.

3. The feedthrough as claimed in claim 1, wherein the pore filler is formed by nanoparticles introduced into the pores of the porous ceramic layer.

4. The feedthrough as claimed in claim 3, wherein a size of the nanoparticles is dependent on an average pore size distribution of the porous ceramic layer, where the nanoparticles are 10% to 80% smaller than the average pore size of the porous ceramic layer.

5. The feedthrough as claimed in claim 1, wherein the porous ceramic layer is formed from at least two layers.

6. The feedthrough as claimed in claim 5, wherein the at least two layers have different porosities.

7. The feedthrough as claimed in claim 6, wherein the at least two layers have equal coefficients of thermal expansion.

8. The feedthrough as claimed in claim 5, wherein the at least two layers have equal coefficients of thermal expansion.

9. The feedthrough as claimed in claim 1, wherein the porous ceramic layer is formed by a plasma-sprayed ceramic which is thermally stable up to 1200 degrees Celsius.

10. The feedthrough as claimed in claim 1, wherein the feedthrough is configured for an exhaust gas system of an internal combustion engine.

11. A process for producing a feedthrough having an internal conductor, an outer sleeve, and at least one insulator formed by a porous ceramic layer and disposed between the internal conductor and the outer sleeve such that the internal conductor is electrically insulated from the outer sleeve, comprising:

filling pores in the porous ceramic layer with a pore filler, wherein the porous ceramic layer is contacted with the pore filler in two or more successive passes, increasing a filling level of the pores with each pass.

12. The process as claimed in claim 11, wherein an average size of nanoparticles used as the pore filler is reduced from pass to pass.

13. The process as claimed in claim 11, wherein the feedthrough with the porous ceramic layer filled with pore filler is subjected to a sintering process.

* * * * *